(12) United States Patent  
Funahashi (10) Patent No.: US 7,062,105 B2  
(45) Date of Patent: Jun. 13, 2006

(54) IMAGE MANAGEMENT SYSTEM, IMAGE MANAGEMENT METHOD AND IMAGE DISPLAY DEVICE

(75) Inventor: Takeshi Funahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 643 days.

(21) Appl. No.: 10/122,726

(22) Filed: Apr. 16, 2002

(65) Prior Publication Data

US 2003/0002748 A1    Jan. 2, 2003

(30) Foreign Application Priority Data

Apr. 16, 2001  (JP) .............................. 2001-116477

(51) Int. Cl.
*G06K 9/40* (2006.01)
*G09G 3/36* (2006.01)
*H04N 5/14* (2006.01)

(52) U.S. Cl. ......................... 382/274; 345/87; 348/671; 358/521

(58) Field of Classification Search ................ 382/169, 382/305, 167; 345/87, 589, 89; 348/254, 348/671, 672; 358/518–523; 707/1, 104

See application file for complete search history.

(56) References Cited

U.S. PATENT DOCUMENTS

| | | | | |
|---|---|---|---|---|
| 5,260,873 A | * | 11/1993 | Hishinuma | .................. 345/605 |
| 5,359,369 A | * | 10/1994 | Izawa et al. | ................. 348/672 |
| 5,959,678 A | * | 9/1999 | Callahan et al. | ............ 348/442 |
| 6,269,379 B1 | * | 7/2001 | Hiyama et al. | .......... 707/104.1 |
| 6,694,051 B1 | * | 2/2004 | Yamazoe et al. | ........... 382/167 |
| 6,850,214 B1 | * | 2/2005 | Nishitani et al. | ............. 345/87 |

* cited by examiner

*Primary Examiner*—Kanjibhai Patel
(74) *Attorney, Agent, or Firm*—Sughrue Mion, PLLC (57) ABSTRACT

An image management system is proposed that can display the same image in the same appearance on each image display device connected to a network independent of individual hardware characteristics. When an image file server that manages diagnostic images transfers the diagnostic image to an image display device connected to the network, it transfers a gradation table describing a gradation correction curve corresponding to the type of display of the image display device to be a destination as well. On the side of the image display device, the diagnostic image will be displayed in the same appearance independent of local characteristics such as hardware or the like by performing luminance correction on the diagnostic image referring to the received gradation table.

9 Claims, 8 Drawing Sheets

IMAGE MANAGEMENT SYSTEM, IMAGE MANAGEMENT METHOD AND IMAGE DISPLAY DEVICE

FIELD OF THE INVENTION

The present invention relates to an image management system, image management method and image display device for managing image data via a network. In particular to an image management system, image management method and image display device for managing diagnostic image data via a network, which is output by various kinds of medical diagnostic image taking apparatuses such as a CT (Computed Tomography) apparatus, MR (Magnetic Resonance) apparatus, CR (Computed Radiography) apparatus, etc.

More particularly, the present invention relates to an image management system, image management method and image display for retaining and managing diagnostic image data that is transferred via a network, and in particular to an image management system, image management method and image display device-capable of viewing the diagnostic images retained and managed on the network on any image display devices connected to the network.

BACKGROUND OF THE INVENTION

Along with the recent progress of information technologies, general purpose computer systems with advanced and powerful computing capabilities have been widely used in the offices of various research organizations and companies as well as in common families. The applicable fields of computers have also extended, wherein not only computer data but also a variety of media data such as images (including both static and moving images) and audio have been treated on computers as digitized files.

For example, in the fields of medical and diagnostic technologies, patients are diagnosed their symptoms based on fluoroscopic images or cross-sectional images of their bodies, which are taken by various modality apparatuses such as a CT (Computed Tomography) apparatus, MR (Magnetic Resonance) apparatus, and CR (Computed Radiography) apparatus.

Conventionally, diagnostic images of patient bodies taken by these kinds of modality apparatuses have only been directly printed out to sensitive films by an image output apparatus that is installed near the modality apparatus. Accordingly, managing the diagnostic images afterward is performed by manually sorting and arranging the films as physical media, thus it requires a significant man power to move, distribute and share the diagnostic images, thereby leading to inefficient works.

On the contrary, recently diagnostic images taken by modality apparatuses are digitized by a reader and managed by a computer as image files. Furthermore, by interconnecting modality apparatuses in a hospital and computers used by doctors and nurses via a network laid in the hospital, medial and diagnostic information such as diagnostic images and medical charts can be treated transparently in the network space. Namely, it becomes possible to transfer the diagnostic images to a remote terminal or to share the medical and diagnostic information among each of the terminals or to perform cooperative diagnoses on the network.

For example, diagnostic image files taken by a radiographer using a modality apparatus and verified afterward are once stored in an image storage server on a network. In this case, a doctor who needs a diagnostic image, can access the image storage server from a terminal on his desk (or in a consultation room), retrieve the diagnostic image, and further transfer the diagnostic image along with the diagnostic results to the image storage server, whereby the diagnostic data of a number of patients can be managed in a lump in the hospital. Moreover, a doctor can retrieve later the diagnostic image from the image storage server and determine a healing condition in time series by comparing it with the latest one. Medical records such as diagnostic images and diagnostic results are obliged or recommended to be saved at medical institutions for a given period of time.

In addition, providing a print server on the network allows sharing of an expensive printer for film printing among multiple modality apparatuses. Namely, technicians and doctors can transfer the image files taken by the modality apparatuses or image files stored on the image storage server to the remote print server to print them out on the films.

Furthermore, it is also possible to install on the network the workstations (WS) for viewing images, that is, image viewers, in addition to the modality apparatuses. Doctors can interpret and diagnose the diagnostic images taken by the modality apparatuses on the image viewer. For interpretation, the image processing conditions applied to the diagnostic images may be changed or corrected by the doctor.

By the way, in a hospital (in particular a large-scaled general hospital), a number of modality apparatuses are installed as sources of diagnostic images. Wherein on each of the modality apparatus, technicians who operates the apparatuses (e.g., radiographers) may take photographs of affected parts or entire bodies of patients or investigate the taken images and then send image data to the image storage server one after another. Doctors retrieve diagnostic image data from the image storage server via the network for interpretation and diagnosis, thereafter they store it in the image storage server as image files with diagnostic results appended. In other words, the image storage server stores a large number of image files to which plural file operators (e.g., doctors or radiographers) perform various operations of their own accord.

The image storage server generally comprises a huge hard disk drive, which temporarily stores vast amounts of image files sent from modality apparatuses or computers used by doctors. However, as a result of endless medical practices, the total capacity of the image files to be retained as medical records may exceed the storage capacity of the hard disk drive at a relatively early stage.

In view of this, the image files temporarily stored on the hard disk drive are moved to removable media such as a DVD (Digital Versatile Disc) or MO (Magnetic-Optical disc), in order to permanently retain the medical records. Though one removable medium naturally has its limit of storage capacity, a nearly inexhaustible amount of image files can be permanently stored by exchanging a medium loaded in the media drive.

By the way, a doctor can perform interpretation and diagnosis by outputting diagnostic images taken by the modality apparatus on a high-resolution CRT display connected to the image viewer. For interpretation, the conditions for image reading or for image processing that are applied to the diagnostic images on the image viewer may be changed.

When displaying such diagnostic images, it is desirable to reproduce the diagnostic image within a range of luminance which human beings are interested in, in order to perform a correct interpretation. However, depending on the difference of characteristics of luminance logarithmic values of the image display devices, even the images with the same dark and light values may appear differently on the respective image display devices. Suppose, for example, that after a radiographer performs quality assurance (QA) for diagnostic images on some display after taking some radiographs, a doctor interprets the diagnostic images on another display. In this case, the doctor may see the images that appear differently from those at the time of quality assurance. In this case, the quality assurance by the radiographer has little meaning and the doctor can not perform a correct interpretation, which may lead to misdiagnosis such as an oversight of the affected areas.

In general, it is preferable that the luminance logarithmic values change uniformly according to the dark and light values so that the appearance in the eyes of observers, that is, the spectral luminous efficacy is constant in any luminance area. On this account, the gradation table, which is the correction curve to give linearity to the luminance logarithmic values, is provided for the image display devices in order to display images with correcting the image values using the gradation table. For a CRT display, for example, since the spectral luminous efficacy decreases at the dark areas, the gradation table has a gradation correction curve to maintain linearity in such luminance areas.

However, this gradation correction curve has a strong dependence on hardware so that it differs depending on the types of display devices. Furthermore, even the same type of displays have unique properties. Also, even the same display device has a correction curve that changes with time. For example, the maximum luminance of CRT (Cathode Ray Tube) display decreases with aged deterioration.

SUMMARY OF THE INVENTION

It is an object of the present invention to provide an excellent image management system, image management method and image display device for managing diagnostic image data via a network. The image data is taken by various kinds of medical diagnostic image capturing apparatuses, such as a CT (Computed Tomography) apparatus, MR (Magnetic Resonance) apparatus, CR (Computed Radiography) apparatus, etc.

It is another object of the invention to provide an excellent image management system, image management method and image display device for displaying diagnostic images in good conditions that are retained and managed on a network on any image display devices connected to the network.

It is a further object of the invention to provide an excellent image management system, image management method and image display device for displaying the same images in the same appearance on each of image display devices connected to a network independent of individual hardware characteristics.

It is a further object of the invention to provide an excellent image management system, image management method and image display device for enabling interpretation of radiographs with the same characteristics at all times by compensating the change of gradation characteristics due to the aged deterioration of hardware.

In view of the above problems, in a first aspect of the present invention, there is provided an image management system or method for managing image files displayed on an image display device connected to a network, comprising:

a recorder or recording step of recording image files;

a storage or storing step of storing a plurality of gradation tables specifying gradation characteristics of each type of display output of the image display device; and a transmitter or transmitting step of transmitting the image file along with the gradation table that corresponds to the type of the display output of the image display device to be a destination.

With the image management system or method according to the first aspect of the invention, when transferring a diagnostic image to the image display device connected to the network, the gradation table is transferred together which describes a gradation correction curve corresponding to the type of display of the image display device to be a destination.

Accordingly, on the side of the image display device, the diagnostic image is displayed with luminance being corrected with reference to the received gradation table so that a good image with the same appearance will be displayed independent of the local characteristics such as the hardware.

It is noted that the above transmitting means or step may transmit the gradation table as separate data from the image file.

Alternatively, the transmitting means or step may transmit the image file to the image display device after reflecting the gradation characteristics defined by the gradation table on the image.

In a second aspect of the invention, there is provided an image display device for displaying images, comprising:

a display unit for displaying the images;

a storage for storing gradation tables that specify gradation characteristics corresponding to multiple maximum luminance;

a detector for measuring the maximum luminance that is output by the display unit; and a processor for performing gradation correction processing specified by the gradation table on the image displayed on the display section by retrieving from the gradation table storing means the gradation table corresponding to the maximum luminance measured by the luminance measuring means.

The image display device may comprise, for example, a CRT (Cathode Ray Tube) display as a display output section. For this type of display, the maximum luminance may decrease due to the aging, wherein the image can not be displayed upon interpretation in accordance with the expected gradation curve.

The image display device according to the second aspect of the invention provides gradation tables beforehand. The gradation table specifies gradation correction curves corresponding to multiple maximum luminance and automatically selects a most appropriate one depending on the aged deterioration of the maximum luminance in order to display images using the almost ideal gradation correction curve.

Namely, interpretation can be always performed with the same characteristics by compensating the change of gradation characteristics due to the aged deterioration of the hardware. Other additional objectives, features and advantages of the present invention will be appreciated with reference to the following detailed explanation about embodiments described in conjunction with the accompanying drawings.

DETAILED DESCRIPTION OF PREFERRED EMBODIMENTS

Now embodiments of the present invention will be described with reference to the drawings.

Figure 1:
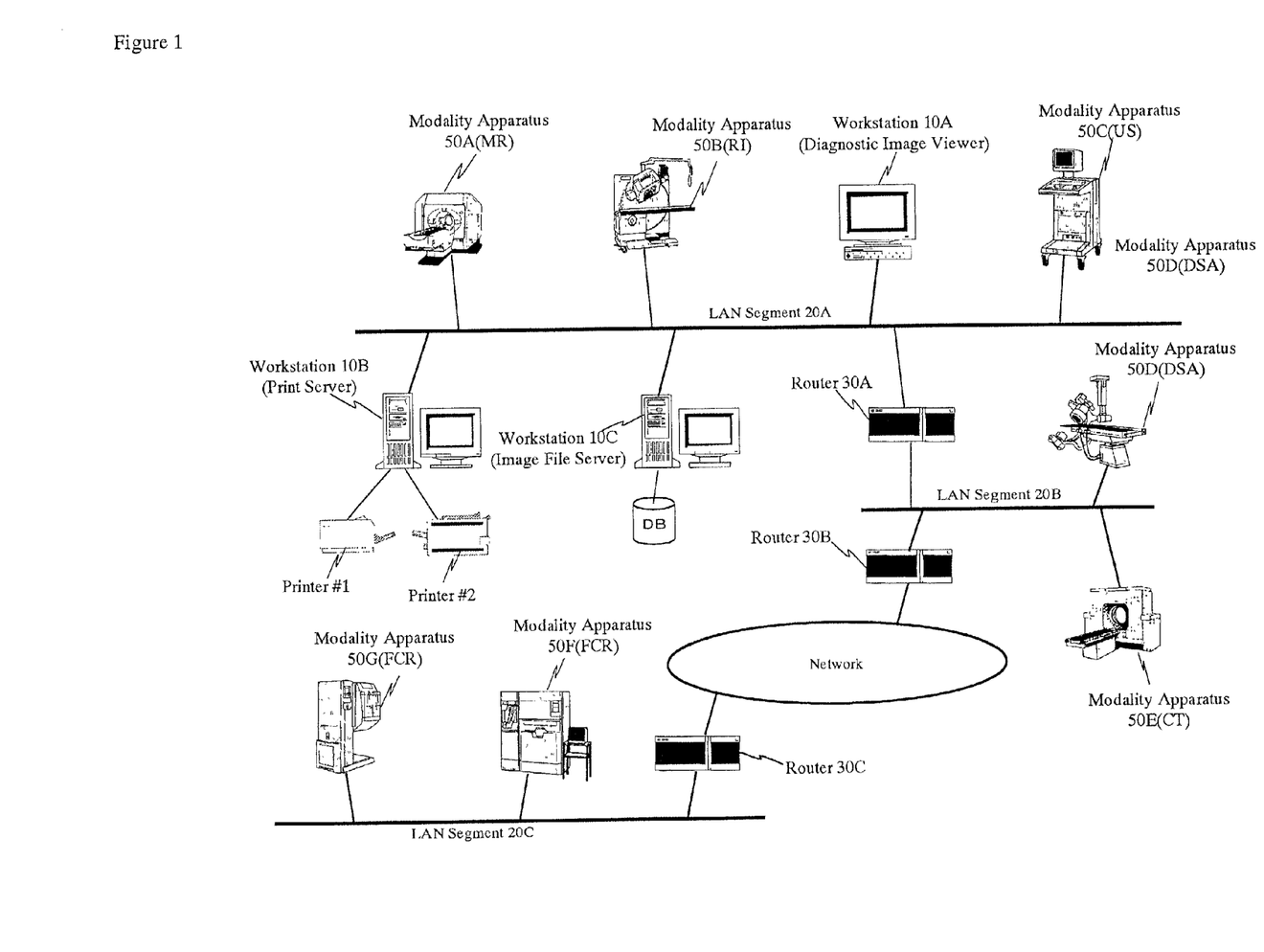
FIG. 1 depicts a schematic diagram of a network system where medical diagnostic image files are shared among multiple terminals.

FIG. 1 shows a schematic diagram of a network system where medical diagnostic image files are shared among multiple terminals. On the network system, medical diagnostic images taken by multiple modality apparatuses 50A, 50B, etc., are dealt with by multiple workstations 10A, 10B, etc. Each of the modality apparatuses and each of the workstations that deal with the diagnostic images are generally connected to the network using the network interface card (NIC) (not shown).

In FIG. 1, the network may be a LAN (Local Area Network) laid in a single hospital, for example. The LAN may be configured by a single LAN segment 20 or by multiple LAN segments that are interconnected via routers (or gateways) 30. Alternatively, the network may be a WAN (wide Area Network) that is configured by connecting LANs each other located at remote hospitals via a dedicated line or may be a WAN like the Internet or an intranet.

Connected to the network are multiple modality apparatuses serving as supply sources of medical images, including a MR (Magnetic Resonance) apparatus 50A, RI apparatus 50B, US apparatus 50C, DSA (Digital Subtraction Angiography) apparatus 50D, CT (Computed Tomography) apparatus 50E, CR (Computed Radiography) apparatus 50F, etc., and workstations 10A, 10B, etc.

Generally, each of the modality apparatuses 50 is located in a dedicated diagnostic room (not shown) in a hospital. Furthermore, specialized technicians such as radiographers are deployed to each of the modality apparatuses. They take photographs of affected parts or entire bodies of patients or inspect the taken images or may possibly photograph again upon request.

A computer system shown by a reference number 10B operates as a print server. Connected to print server 10B are, for example, two printers locally via adapter cards (not shown). Print server 10B performs to the image data sent from each of the modality apparatuses 50 on the network the format operation (such as a layout operation on a film with a predetermined size), enlargement or reduction operation of images, and gradation conversion suitable for interpretation and diagnosis before printout.

A printer for medical diagnostic images is typically a type of that which forms an image on a sensitive film rather than plain paper. The reason for using a film rather than plain paper as an output medium is due to the high resolution of the film compared with plain paper (particularly a dynamic range is wide), which allows correct observation, that is, interpretation of the affected parts based on the output images.

A workstation (WS) shown by a reference number 10C operates as a file server, which comprises a mass storage device for storing a huge amount of diagnostic image files.

A further workstation (WS) shown by a reference number 10A operates as an image viewer. A doctor manipulates the image viewer 10A to retrieve a plurality of past diagnostic images from file server 10B and check the process of recovery or the evolution of the disease on the display screen, and which typically comprises a high-resolution CRT (Cathode Ray Tube) display with a large screen. The description about interpretation, that is, diagnostic results by a doctor is saved in the image file server 10C along with the diagnostic image files.

Each of the workstations 10 and modality apparatuses 50 on the network is connected transparently according to a predetermined communication protocol. For example, for an OSI (Open Systems Interconnection) reference standard model, a physical layer and data link layer of the network are configured by the Ethernet, while a transport layer and network layer are configured by the TCP/IP (Transmission Control Protocol/Internet Protocol). Upper layers higher than a session layer inclusive are provided as specialized protocols given by each of the manufacturers of medical products.

One of the representative upper layers of the medical industry is DICOM (Digital Imaging and Communication for Machine). DICOM is the industrial standard specifying the transfer of images and other medical information between computers, which allows the digital communication between a diagnostic apparatus and a therapeutic apparatus produced by different manufacturers.

Using the network system for medical images as shown in FIG. 1, every medical image data acquired in a hospital is computerized and thereafter moved, transferred, distributed or shared among multiple terminals on the network. Namely, diagnostic data obtained in a diagnostic room can be viewed in another diagnostic room (or a diagnostic room in a remote hospital). It is also possible to check the process of recovery or the evolution of the disease by retrieving the past diagnostic images from the file server 10C as needed. Furthermore, computer resources, such as an expensive film printer for outputting images taken by the modality apparatuses 50 or images retrieved from file server 10C, are shared among multiple modality apparatuses and workstations.

Figure 2:
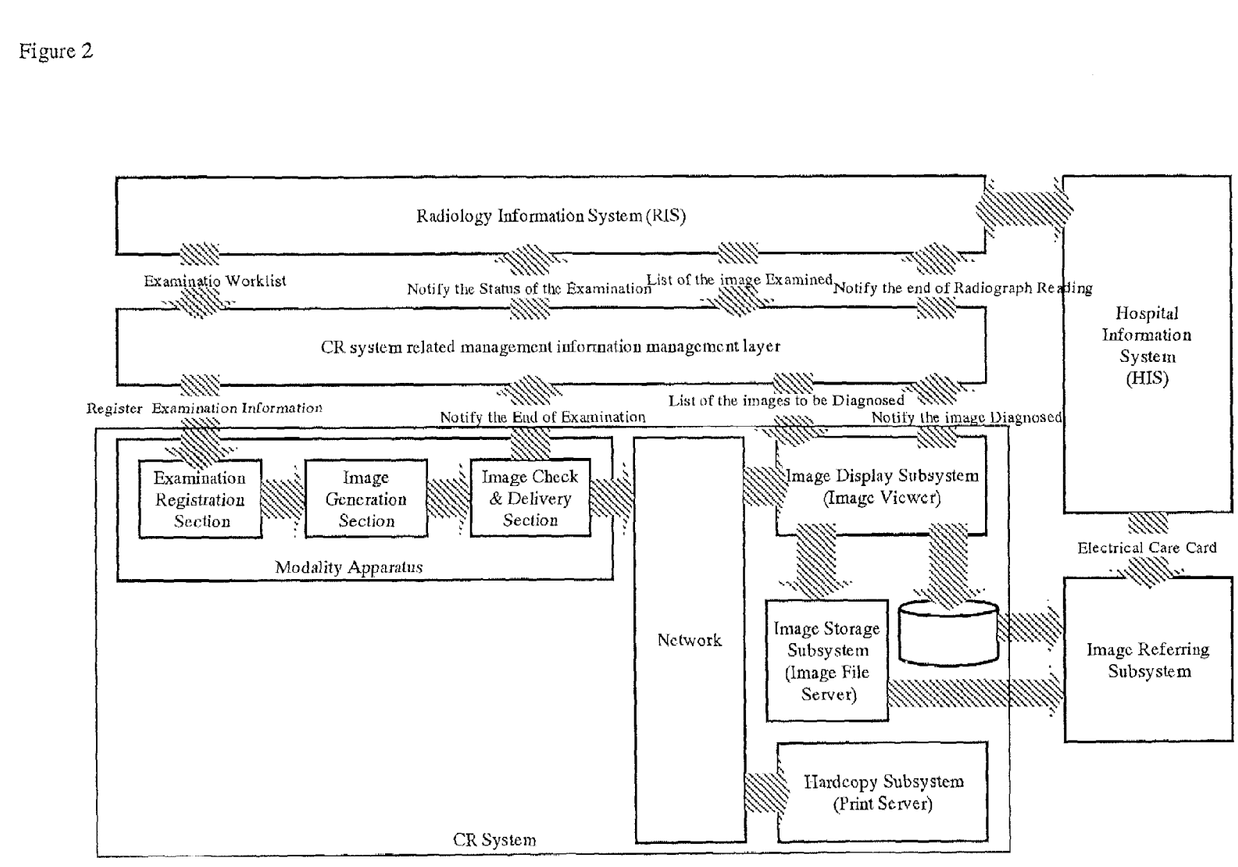
FIG. 2 depicts a functional block diagram for managing computerized diagnostic images in a network system for medical images.

Using the network structure shown in FIG. 1, diagnostic images are digitized, that is, computerized and managed and shared in the network for the purpose of diagnostic operations. FIG. 2 depicts a functional block diagram for managing computerized diagnostic images in a network system for medical images. The system shown in FIG. 2 comprises a RIS (Radiology Information System), a CR system related management information management layer, and a CR system.

The radiology information system totally manages the diagnostic images and other information dealt with by the department of radiology in a hospital. Generally, the department of radiology has one or more modality apparatus such a CR, wherein each of the modality apparatuses is located in a dedicated photographic room (not shown).

The CR system related information management layer constructs a database composed of RIS information and CR system information. This layer manages a series of processing ranging from generation of diagnostic images at the CR system to diagnosis of them using this database as well as notifies the status of the examination progress to the upper radiology information system.

The CR system that exchanges data with the CR system related information management layer comprises a modality apparatus, an image display subsystem, an image storage subsystem, and a hard copy subsystem. The image display subsystem is embodied by an image viewer 10A, the image storage subsystem is embodied by an image file server 10C, and the hard copy subsystem is embodied by a print server 10B and film printer.

The modality apparatus comprises an examination registration section, an image generation section, and an image check and delivery section, those of which perform registration of taken images in response to an examination request, image generation, image check and delivery, and notification of the end of the examination.

The radiology information system has an interface with a hospital information system (HIS) that totally manages medical information, and receives examination requests at the department of radiology or feeds back the examination results.

The CR system related information management layer acquires an examination work list from the radiology information system and registers the examination information with the modality apparatus.

The modality apparatus is used by a radiographer to generate diagnostic images of patients according to the examination information registered as well as notifies the CR system related information management layer of the end of the examination. The diagnostic images checked at the modality apparatus may be transferred to the image display subsystem or hard copy subsystem via the network.

In response to the notification of the end of the examination from the modality apparatus, the CR system related information management layer notifies the radiology information system of the status of the examination progress. Furthermore, receiving from the radiology information system a list of images for which the examination has ended, the CR system related information management layer creates a list of images that can be diagnosed and sends this list to the image display subsystem.

Based on the list of images that can be diagnosed, the image display subsystem is used by a doctor to diagnose the diagnostic images. Then the image display subsystem returns notification of the end of the interpretation to the CR system related information management layer, and in turn the latter returns notification of the end of the interpretation to the radiology information system. The diagnostic images interpreted may be transferred to the image storage subsystem or hard copy subsystem via the network.

By using the image display subsystem, a doctor creates and stores reports concerning the diagnostic results. The image display subsystem further refers to the diagnostic results of the image display subsystem and the diagnostic images saved in the image storage subsystem, and then integrates those kinds of information into a care card sent from the medical information system.

Figure 3:
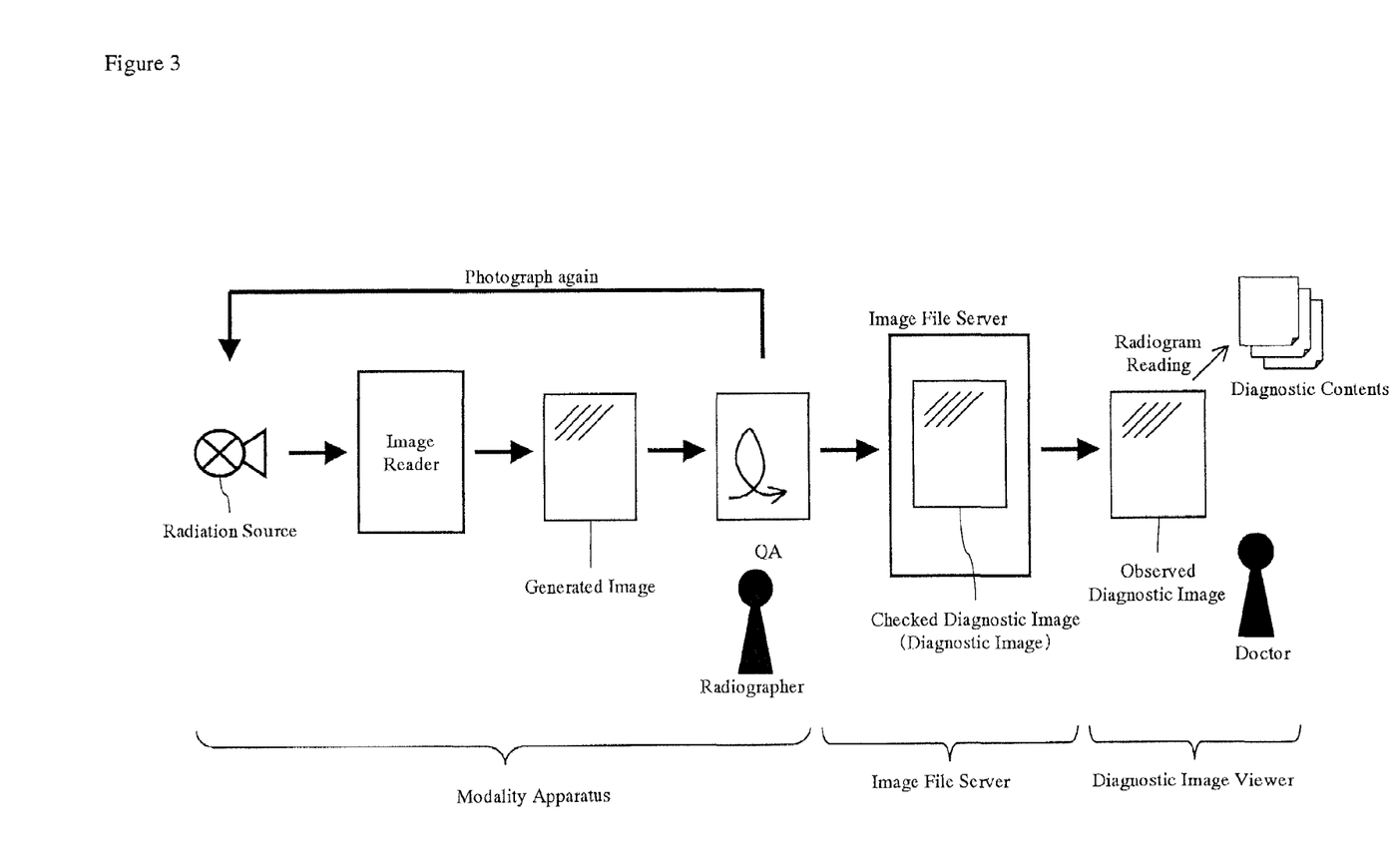
FIG. 3 depicts a flow of diagnostic image files dealt with on a network system for medical images according to a flow of medical and diagnostic operations.

FIG. 3 depicts a flow of diagnostic image files dealt with on a network system for medical images according to a flow of medical and diagnostic operations.

A technician using a modality apparatus takes photographs of affected parts or entire bodies of patients and then reads the taken images using a reader to obtain "generated images" in a digital format.

Next, the technician determines on an image check apparatus whether the generated images are in sufficient quality for a doctor to diagnose. One of the image-check operations is called QA (Quality Assurance). A set of a radiation source, radiogram reader and image checker constitutes a modality apparatus.

In the process of QA, a radiographer may adjust image processing parameters such as the one for dark and light adjustment of the taken image, nevertheless, if the image of sufficient quality for a doctor to diagnosis can not be obtained, the diagnostic image may be photographed again upon request. It is noted that the diagnostic image that has passed the QA process is also called a "checked diagnostic image".

The image processing parameters that can be set at a user level, such as a radiographer or a doctor, are roughly classified into GP (gradation processing) parameters, RP (frequency processing) parameter, DRC (dynamic range compressed processing) parameters, and TAS (linear tomographic fault shade removal processing) parameters. Each of the image processing parameters are detailed below.

TABLE 1

GP (Gradation Processing) Parameters

| Parameter | Properties | Input Range |
| --- | --- | --- |
| GA | The tendency of the gradation curve. It adjusts the contrast of the image. | −4.0~−0.1 0.1~4.0 |
| GT | Figure of the gradation curve. It has the same effect as the changing of the γ curve of several kind of X ray film. | A~Z |
| GC | A central density of the tendency of the gradation curve. It changes GA centering around GC. | 0.30~2.64 |
| GS | A parallel movement of gradation curve. It can adjust the display density of the entire image. | −1.44~1.44 |
| S-Shift | A coefficient relating to the original sensitivity. It can adjust the display density of the entire image. | /(÷)2.0~ (x)2.0 |
| C-Shift | A coefficient relating to GA. It can adjust the contrast of the entire image. | (x)0.5~2.0 |

TABLE 2

RP (Frequency Processing) Parameters

| Parameter | Properties | Input Range |
| --- | --- | --- |
| RN | Emphasized frequency range in frequency processing. | 0~9 (10 types) |
| RT | Figure of the curve in accordance with the density of image. It adjusts the level of emphasis within a predetermined density range. | A~Z |
| RE | Emphasizing density of frequency processing. The Intensity of the process changes in accordance with RE value. | 0.0~9.9 10~16 |

TABLE 3

RP (dynamic range compressed processing) Parameters

| Parameter | Properties | Input Range |
| --- | --- | --- |
| DRN | The mask size of DR compressing. It sets the processing range along with DRT. | 0~9 (10 types) |
| DRT | Type of DR compressing filter. It sets the range to be processed. | A~T (20 types) |
| DRE | The level of DR compress filtering process. The intensity of the process changes in accordance with DRE value. | 0.0~9.9 10~16 |

TABLE 4

TAS (linear tomographic fault shade removal processing) Parameters

| Parameter | Properties | Input Type |
| --- | --- | --- |
| ORN | The mask size of one-dimensional BOKE mask processing. Set the most effective size in accordance with the dislocation angle. | 0~9 (10 types) |
| ORE | The level of emphasis of one-dimensional BOKE mask processing. The intensity of the process changes in accordance with ORE value. | 10~16 |
| ORD | The direction of one-dimensional BOKE mask processing. Set the direction in accordance with the scanning direction and the track direction of the dislocation. | 0:orthogonal 1:parallel |

The "generated diagnostic images" and "checked diagnostic images" operated by the radiographer may be saved on a local disk in the modality apparatus or may be transferred to the image file server 10C and saved therein. The checked diagnostic images are once stored on the image file server 10C. In other words, the checked diagnostic images are what is subject to diagnosis, wherein an access right to them is granted to doctors and nurses who prepare for those diagnostic images for doctors.

A doctor retrieves diagnostic images of a predetermined patient on a workstation serving as a diagnostic image viewer 10A in order to make an interpretation, that is, to make a diagnosis. Upon interpretation, the doctor may change the image processing parameters (e.g., for dark and light adjustment) of the diagnostic images. The diagnostic image that has been interpreted by the doctor is also called an "interpreted diagnostic image" herein. The image processing parameters applied to the diagnostic contents and images by a doctor are important medical records, which are saved in the image file server 10C along with the interpreted diagnostic images.

In each of the processes of generation, check and interpretation of diagnostic images shown in FIG. 3, various kinds of collateral information is appended to the diagnostic image, including information of a corresponding patient, an examination date, and examination contents. These kinds of collateral information are important as a medical record along with the diagnostic images.

Figure 4:
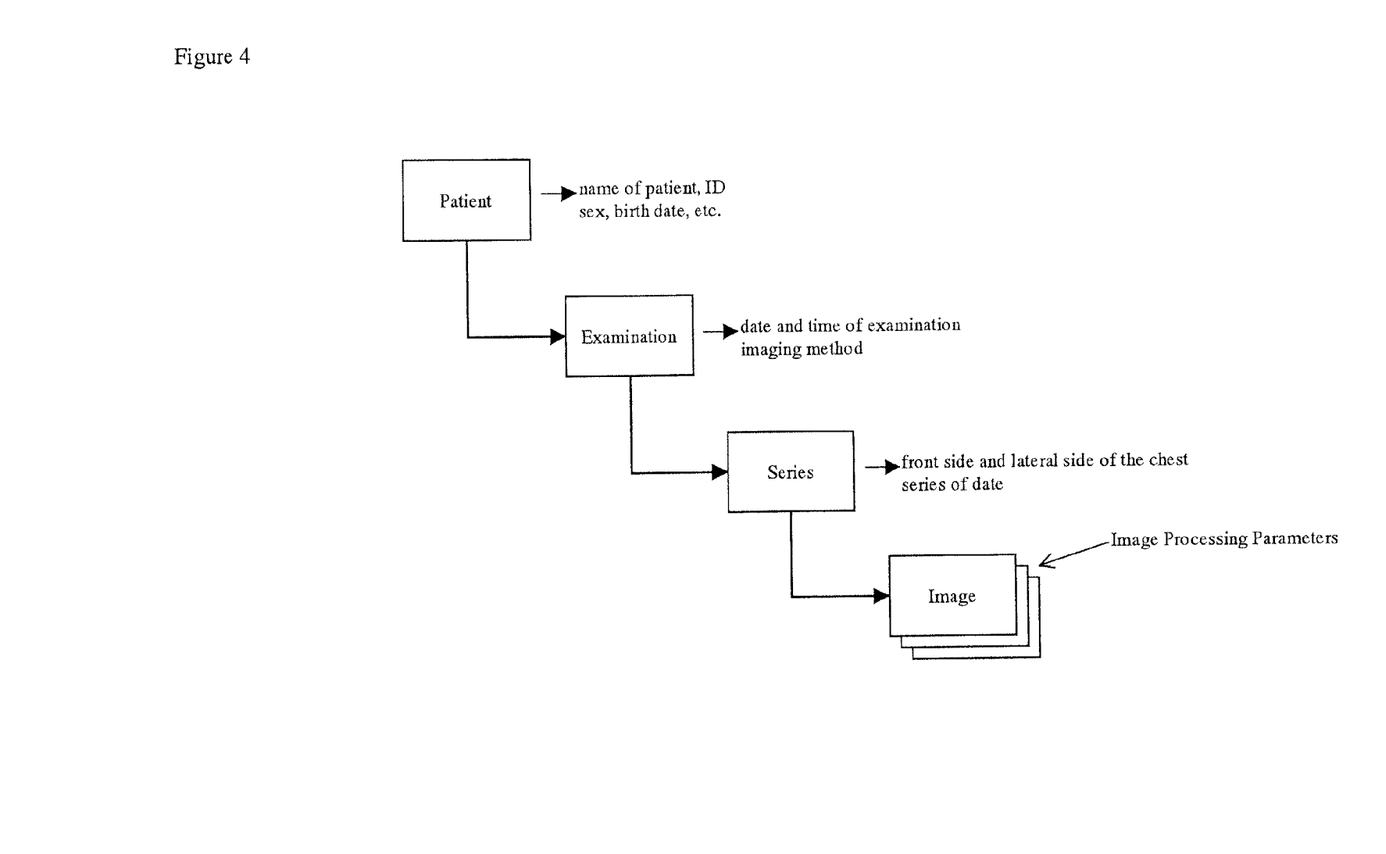
FIG. 4 depicts a structure of a diagnostic image file.

In the embodiment of the present invention, the diagnostic image file is described with being structured as shown in FIG. 4, thus the collateral information can be dealt with concurrently with the diagnostic image. As shown in FIG. 4, the diagnostic image file comprises a patient field, an examination field, a series field, and an image field.

In the patient field, there is written personal information for identifying a patient corresponding to the diagnostic images or specifying a class, such as a name of patient, an identification number, sex, a birth date, etc.

In the examination field, there are written an examination date when photographs are taken, time, an imaging method (e.g., simple imaging of inner chest), etc.

In the series field, there are written a series of dates and time when the affected parts, such as the front side and lateral side of the chest, have been photographed in sequence.

One image file can contain one or more frames of image data. The image processing parameters applied to each image data (e.g., direction of image) may be saved in conjunction with the image data. In addition, tag information showing that interpretation has been done may be appended to the image data that has already been interpreted by a doctor.

In a network system according to the embodiment of the invention, the image file server 10C may retain diagnostic images on hard disks in response to requests from clients or may automatically archive the diagnostic images on a removable medium, thereby averting the risk of involuntarily deleting important diagnostic images as well as saving the operators the trouble of storage operations. It is noted that a client refers to herein a modality apparatus that generates diagnostic images or a radiographer serving as its operator, or an image viewer or a doctor who interprets the diagnostic images on the image viewer with applying the image processing parameters to the images.

The diagnostic images that are temporarily stored or permanently archived in image file server 10C are read by image viewer 10A operated by a doctor for the purpose of interpretation, that is, diagnosis. In the process of interpretation, the conditions for image reading or image processing applied to the diagnostic images may be changed.

The conditions for image processing may include reversible ones such as modification of dark and light values. An original image can be reproduced from the resulting image after the image processing has been performed by storing the image processing parameters, and irreversible ones such as normalization processing, wherein an original image cannot be reproduced because pixel values themselves are changed.

Radiographers and doctors may retrieve diagnostic images stored in image file server 10C to display them on the display of image viewer 10B and then perform quality assurance (QA) of generated images, interpretation of checked images, or reinterpretation of diagnosed images.

For correct interpretation, it is preferable to reproduce the diagnostic images within a range of luminance which human beings are interested in. However, in accordance with the difference of characteristics of luminance logarithmic values of the respective image display, even the images with the same dark and light values may appear differently on the respective image display devices. Suppose, for example, that after a radiographer performs quality assurance (QA) for diagnostic images on some display after taking some radiographs, a doctor interprets the diagnostic images on another display. In this case, the doctor may see the images that appear differently from those at the time of quality assurance. In this case, the quality assurance by the radiographer has little meaning and the doctor can not perform a correct interpretation, which may lead to misdiagnosis such as an oversight of the affected areas.

In general, it is preferable that the luminance logarithmic values change uniformly according to the dark and light values so that the appearance in the eyes of observers, that is, the spectral luminous efficacy is constant in any luminance area. On this account, the gradation table, which is the correction curve to give linearity to the luminance logarithmic values, is provided for the image display devices in order to display images with correcting the image values using the gradation table.

According to the embodiment of the invention, image file server 10C manages diagnostic images (or any other device that can manage diagnostic images in a centralized manner on the network), and transfers the diagnostic image to image viewer 10C (or an image display device connected to the network). It also transfers a gradation table describing a gradation correction curve corresponding to the type of display (or hardware characteristics or individual differences) of the display device to be a destination as well.

In this case, on the side of the image display device, the diagnostic image will be displayed in the same appearance independent of local characteristics such as hardware or the like even if the diagnostic image is displayed as it is. Therefore, a doctor can perform a correct interpretation.

According to another embodiment of the invention, the image file server 10C manages diagnostic images (or any other device that can manage diagnostic images in a centralized manner on the network), and transfers the diagnostic image to image viewer 10A (or an image display device connected to the network). It also performs luminance correction using a gradation table describing a gradation correction curve corresponding to the type of display (or hardware characteristics or individual differences) of the display device to be a destination before transferring that diagnostic image.

In this case, on the side of the image display device, the diagnostic image will be displayed in the same appearance independent of local characteristics such as hardware or the like even if the diagnostic image is displayed as it is. Therefore, a doctor can perform a correct interpretation.

Figure 5:
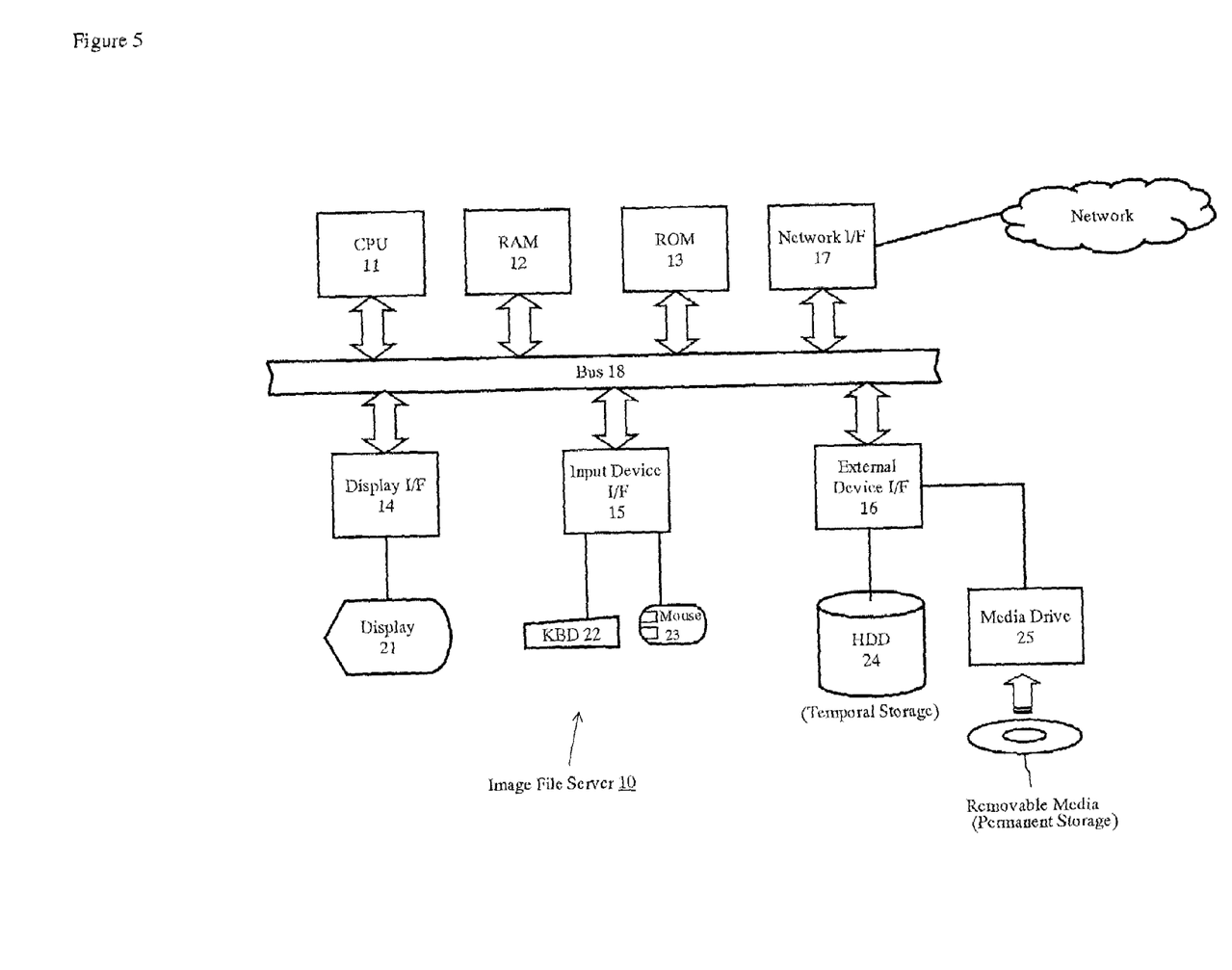
FIG. 5 depicts a hardware configuration of a computer system 10 capable of operating as image file server 10C and image viewer 10A.

FIG. 5 depicts a hardware configuration of a computer system 10 capable of operating as image file server 10C and image viewer 10A. An example of computer system 10 may be a workstation (WS) or personal computer (PC) that consists of an IBM PC/AT (Personal Computer/Advanced Technology) compatible machine or its successor machine. Hereinafter, each part of computer system 10 will be described.

A CPU (Central Processing Unit) 11 serving as a main controller of the system 10C performs various kinds of applications under the control of the operating system (OS). CPU 11 can execute, for example, file server applications that perform management of diagnostic image files or applications for displaying and interpreting the diagnostic images on the display.

As shown in FIG. 5, CPU 11 is interconnected to other devices (described below) via a bus 18. Each of the devices on bus 18 is granted a unique memory address or I/O address, thus CPU 11 can access each of the devices connected to bus 18 by addressing. Bus 18 is a common signal transmission path including an address bus, data bus and control bus, an example of which is PCI (Peripheral Component Interconnection) bus.

RAM (Random Access Memory) 12 is a volatile storage device used to store program codes executed in CPU 11 or temporarily store work data under execution. ROM (Read Only Memory) 13 is a nonvolatile storage device for permanently storing program codes or data, in which BIOS (Basic Input/Output System) or POST (Power-On Self Test Program) are stored, for example.

Display interface 14 is a peripheral device for actually processing draw instructions issued by CPU 11. Drawing data processed in display interface 14 may be once written to a frame buffer (not shown) before being output to display 21. Display 21 may be a CRT (cathode ray tube) display, for example.

Input device interface 15 connects user input devices, such as a keyboard 22 and mouse 23, to system 10.

Network interface 17 connects system 10 to a network (not shown) such as a LAN (Local Area Network) according to a predetermined communication protocol such as Ethernet. Network interface 17 is typically provided in the form of LAN adapter card, which is installed into a PCI bus slot on the mother board (not shown).

Multiple host computers are connected transparently on the LAN to construct a distributed computing environment. Furthermore, some of the host computers operate as a router to interconnect to other LANs or external networks such as the Internet. For example, the diagnostic images generated by the modality apparatus are transferred or delivered via the network.

External device interface 16 is a device for connecting external devices such as hard disk drive (HDD) 24 and media drive 25 to system 10C. External device interface 16 complies with an interface standard such as IDE (Integrated Drive Electronics) and SCSI (Small Computer System Interface).

HDD 24 is an external storage device loading a magnetic disk fixedly as a storage medium and is superior to other external storage devices in terms of storage capacity and data transfer rate. It is noted that placing a software program on HDD 24 in an executable condition is called "installing" a program in a system. Typically, on HDD 24 are stored a program code of the operating system executed by CPU 11, application programs, and device drivers in a nonvolatile condition. For example, server applications involved in the present invention or applications for displaying and interpreting diagnostic images are installed on HDD 24. For image file server 10C, HDD 24 is used to temporarily store the diagnostic image files sent from external devices such as modality apparatuses and image viewers. HDD 24 is also utilized to store gradation tables corresponding to multiple maximum luminance.

Media drive 25 is a device for loading removable media such as a CD (Compact Disk), MO (Magneto-Optical disk) and DVD (Digital Versatile Disk) and accessing their recording surface. The removable media is mainly used to back up software programs and data files in a computer-readable format or to move (including sales, logistics, distribution) them among multiple systems.

In the image file server 10C, the removable media are used as a permanent storage for diagnostic image files. Though the storage capacity of one piece of removable medium is finite, replacing the medium on the media drive 25 provides nearly inexhaustible storage capacity.

Figure 6:
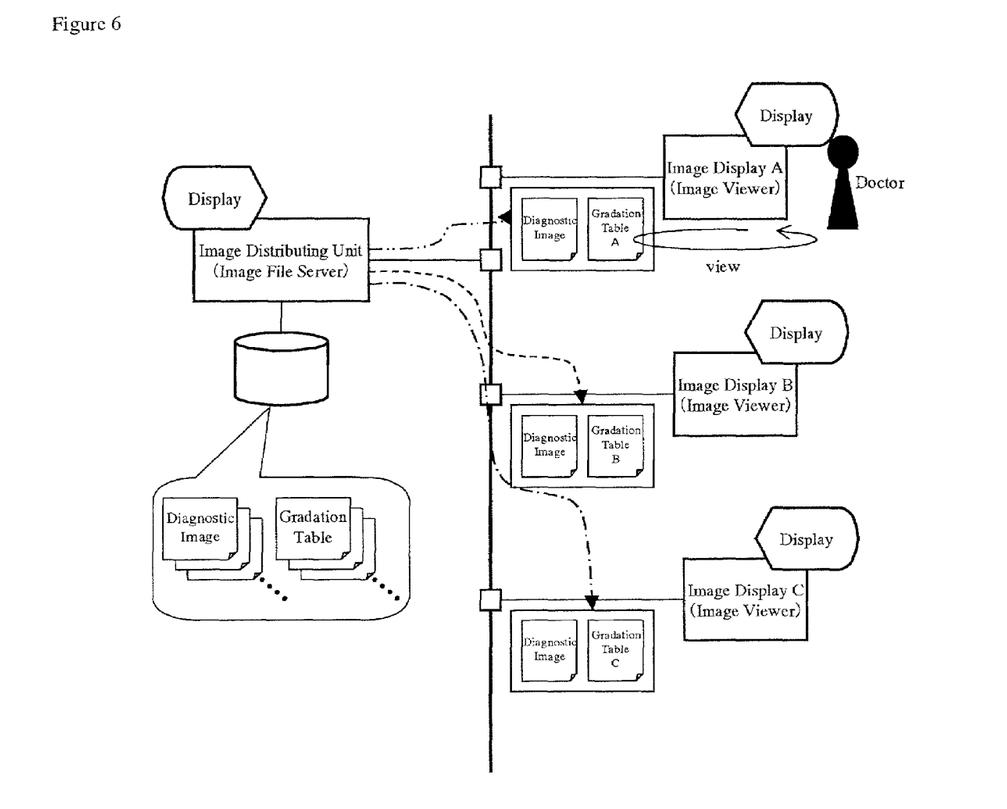
FIG. 6 is a diagram illustrating a transfer function of image information performed between image file server 10C and external devices such as modality apparatuses 50 and image viewer 10A.

Next, with reference to FIG. 6, it will be described about a transfer function of image information performed between the image file server 10C and external devices such as modality apparatuses 50 and image viewer 10A.

Image file server 10C, which serves as an image storage device for storing diagnostic image files, is interconnected via the network with each of the modality apparatuses 50 serving as image generation devices and multiple image display devices A, B and C (image viewers).

Each of modality apparatuses 50 is comprised of a reader for capturing diagnostic images using radiation and an image check and delivery apparatus for checking and transmitting the diagnostic images via a network. Modality apparatuses 50 are operated by specialized technicians (e.g., radiographer) to photograph (or photograph again upon request) the diagnostic images or to perform check operations. The checked diagnostic images may be transferred to image file server 10C serving as an image delivery apparatus, where they are temporarily stored on the hard disk or permanently archived on the removable disk. Alternatively, the checked diagnostic images may be directly transferred to respective image display devices A, B and C with passing image file server 10C.

Image display devices A, B and C are operated by a doctor who performs interpretation, that is, diagnosis of diagnostic images, then the diagnostic contents and results are written to the diagnostic image file. The diagnostic images displayed on the image display devices A, B and C may be transferred directly from modality devices 50 or may be transferred after temporarily stored in image file server 10C.

Assuming that the appearance is different from each other depending on the difference of characteristics of luminance logarithmic values for each of the image display devices A, B and C. It is preferable that the luminance logarithmic values change uniformly according to the dark and light values so that the appearance in the eyes of observers, that is, the spectral luminous efficacy is constant in any luminance area. As shown in FIG. 6, each of the image display devices A, B and C can provide the linearity to the luminance logarithmic values by referring to the gradation correction curve specified in the respective gradation tables. Therefore the image display devices A, B and C can display the image in the same appearance as other display devices.

Image file server 10C manages the diagnostic images generated by modality apparatuses 50 as well as provides multiple gradation tables describing gradation correction curves corresponding to each type of display (or hardware characteristics or individual differences). When transferring the diagnostic images to the image display devices A, B and C, image file server 10C transfers the gradation table together that corresponds to the type of display of the image display device to be a destination.

Accordingly, on the side of the image display devices A, B and C, the diagnostic image is displayed with luminance being corrected with reference to the received gradation table so that a good image with the same appearance will be displayed independent of the local characteristics such as the hardware.

Figure 7:
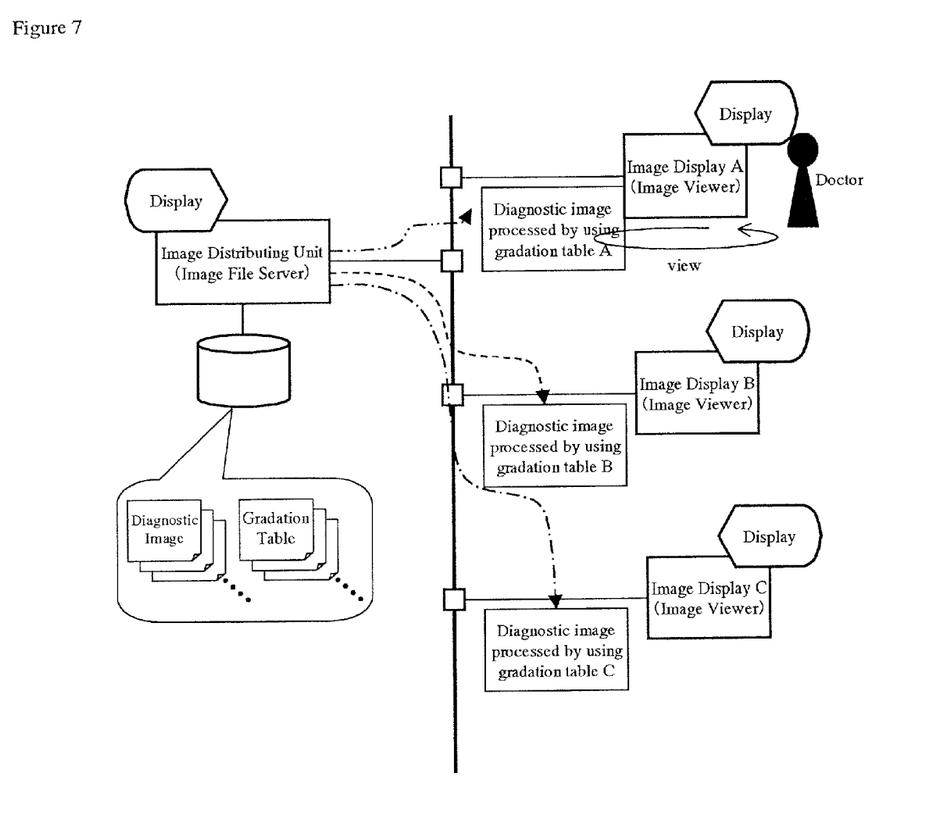
FIG. 7 is a diagram illustrating another transfer function of image information performed between image file server 10C and external devices such as modality apparatuses 50 and image viewer 10A.

Now with reference to FIG. 7, it will be described about another transfer function of image information performed between the image file server 10C and external devices such as modality apparatuses 50 and image viewer 10A.

Image file server 10C, which serves as an image storage device for storing diagnostic image files, is interconnected via the network with each of the modality apparatuses 50 serving as image generation devices and multiple image display devices A, B and C (image viewers).

Each of modality apparatuses 50 is comprised of a reader for capturing diagnostic images using radiation and an image check and delivery apparatus for checking and transmitting the diagnostic images via a network. Modality apparatuses 50 are operated by specialized technicians (e.g., radiographer) to photograph (or photograph again upon request) the diagnostic images or to perform check operations. The checked diagnostic images may be transferred to image file server 10C serving as an image delivery apparatus, where they are temporarily stored on the hard disk or permanently archived on the removable disk.

Alternatively, the checked diagnostic images may be directly transferred to respective image display devices A, B and C with passing image file server 10C.

Image display devices A, B and C are operated by a doctor who performs interpretation, that is, diagnosis of diagnostic images, then the diagnostic contents and results are written to the diagnostic image file. The diagnostic images displayed on the image display devices A, B and C may be transferred directly from modality devices 50 or may be transferred after temporarily stored in image file server 10C.

Assuming that the appearance be different from each other depending on the difference of characteristics of luminance logarithmic values for each of the image display devices A, B and C. As shown in FIG. 7, each of the image display devices A, B and C can provide linearity to the luminance logarithmic values devices by referring to the gradation correction curve specified by the respective gradation tables, so that they can display outputs in the same appearance as other display.

Image file server 10C manages the diagnostic images generated by modality apparatuses 50 as well as provides multiple gradation tables describing gradation correction curves corresponding to each type of display (or hardware characteristics or individual differences). The image file server 10C transfers the diagnostic images whose luminance has been corrected using respective gradation tables A, B and C that describe respective gradation correction curves corresponding to the respective kinds of displays of the image display devices to be a destination.

Accordingly, on the side of the image display devices A, B and C, the diagnostic image is displayed in the same appearance independent of local characteristics such as hardware or the like even when displaying the diagnostic image as it is. Therefore, a doctor can perform a correct interpretation.

Figure 8:
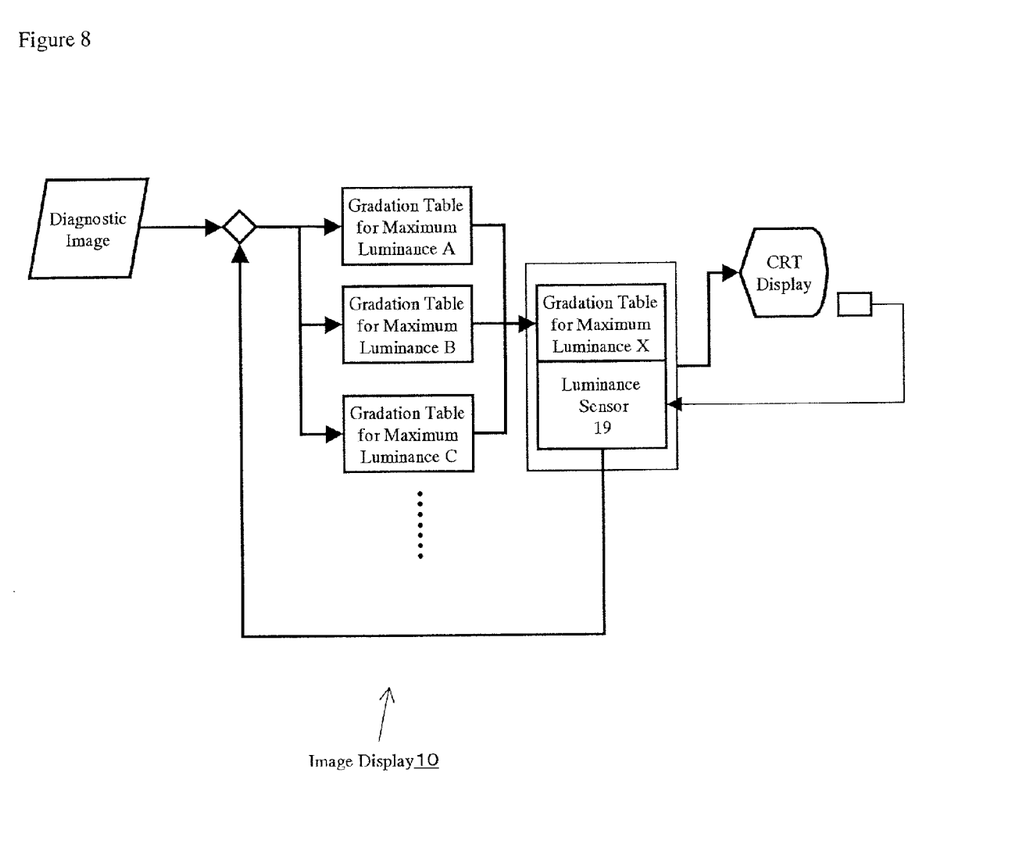
FIG. 8 depicts an example of configuration of an image display device according to the embodiment of the present invention.

FIG. 8 depicts an example of configuration of an image display device according to the embodiment of the present invention.

The image display device comprises a CRT (Cathode Ray Tube) display as a display output section. For this type of display, the maximum luminance may decrease due to the aging, wherein the image can not be displayed upon interpretation in accordance with the expected gradation curve.

In view of this, the image display device 10 shown provides gradation tables beforehand that specify gradation correction curves corresponding to multiple maximum luminance and automatically selects a most appropriate one depending on the aged deterioration of the maximum luminance in order to display images using the almost ideal gradation correction curve.

The image display device 10 comprises a luminance measuring sensor 19 for measuring the maximum luminance on the display screen. It selects the most appropriate gradation table corresponding the aged deterioration of the display among the multiple ones prepared beforehand depending on the measured maximum luminance and uses this table to display images. In the example shown in FIG. 8, depending on the maximum luminance measured at luminance measuring sensor 19, it is seen that the gradation table for the maximum luminance X is selected and display processing is performed according to that gradation correction curve.

Accordingly, with the display device according to the embodiment, interpretation can be performed with the same characteristics at all times by compensating the change of gradation characteristics due to the aged deterioration of hardware.

As mentioned above, according to the present invention, there is provided an excellent image management system, image management method and image display device for managing diagnostic image data via a network. The image management system according to the present invention can handle various kinds of medical diagnostic image taken by apparatuses, such as a CT (Computed Tomography) apparatus, MR (Magnetic Resonance) apparatus and CR (Computed Radiography) apparatus.

Furthermore, there is provided an excellent image management system, image management method and image display device for displaying diagnostic images in good conditions that are retained and managed on a network on any image display devices connected to the network.

In addition, there is provided an excellent image management system, image management method and image display device for displaying the same images in the same appearance on each of image display devices connected to a network independent of individual hardware characteristics.

Still further, there is provided an excellent image management system, image management method and image display device for enabling interpretation of radiographs with the same characteristics at all times by compensating the change of gradation characteristics due to the aged deterioration of hardware.

The present invention has been described with reference to the specific embodiments. However, in view of this disclosure, it will be apparent to those skilled in the art that numerous changes and modifications can be made without departing from the scope and spirit of the invention. Namely, the disclosed invention is to be considered merely as illustrative.

The invention claimed is:

1. An image management system for managing image files displayed on an image display device connected to a network, comprising:
    a recorder for recording the image files;
    a storage for storing a plurality of gradation tables specifying gradation characteristics of each type of display output of the image display device; and
    a transmitter for transmitting the image file along with the gradation table that corresponds to the type of the display output of the image display device to be a destination,
    wherein the image display device is an aged CRT and the gradation table is based on the aged CRT.

2. The system according to claim 1, wherein the transmitter transmits the gradation table as separate data from the image file.

3. The system according to claim 1, wherein the transmitter transmits the image file to the image display device after reflecting the gradation characteristics defined by the gradation table on the image.

4. An image management method for managing image files displayed on an image display device connected to a network, comprising the steps of:
    recording the image files;
    storing a plurality of gradation tables specifying gradation characteristics of each type of display output of the image display device; and
    transmitting the image file along with the gradation table that corresponds to the type of the display output of the image display device to be a destination,
    wherein the network includes a plurality of different types of image display devices and wherein when transmitting the image file and gradation table, the gradation table transmitted is specific to each of the plurality of different types of image display devices.

5. The method according to claim 4, wherein the transmitting step transmits the gradation table as separate data from the image file.

6. The method according to claim 4, wherein the transmitting step transmits the image file to the image display device after reflecting the gradation characteristics defined by the gradation table on the image.

7. An image display device for displaying images, comprising:
    a display for displaying the images;
    a storage for storing gradation tables that specify gradation characteristics corresponding to multiple maximum luminance;
    a sensor for measuring the maximum luminance that is output by the display section; and
    a processor for performing gradation correction processing specified by the gradation table on the image displayed on the display section by retrieving from the gradation table storing means the gradation table corresponding to the maximum luminance measured by the luminance measuring means.

8. The image display device for displaying images according to claim 7, wherein the display section is a CRT.

9. The image display device for displaying images according to claim 7, wherein the gradation correction processing is based on a measured feedback directly from the display section.

* * * * *